May 6, 1924.
L. S. LACHMAN
PROCESS OF ELECTRIC WELDING
Filed Feb. 18, 1922
1,492,991
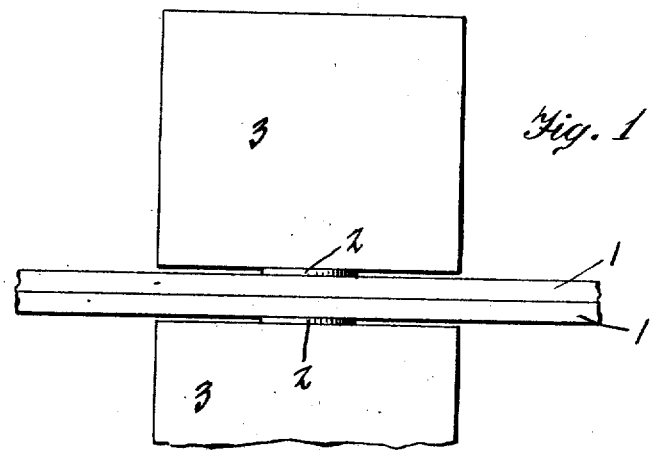
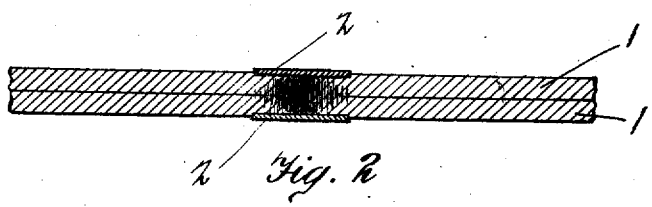
INVENTOR
Lawrence S. Lachman
BY
Townsend + Decker
ATTORNEYS Patented May 6, 1924.

1,492,991

UNITED STATES PATENT OFFICE.

LAURENCE S. LACHMAN, OF NEW YORK, N. Y., ASSIGNOR TO UNIVERSAL ELECTRIC WELDING COMPANY, OF LONG ISLAND CITY, NEW YORK, A CORPORATION OF NEW YORK.

PROCESS OF ELECTRIC WELDING.

Application filed February 18, 1922. Serial No. 537,375.

*To all whom it may concern:*

Be it known that I, LAURENCE S. LACHMAN, a citizen of the United States, and a resident of New York, in the county of New York and State of New York, have invented certain new and useful Improvements in Processes of Electric Welding, of which the following is a specification.

My invention relates to processes of electric welding employed for welding two pieces or plates of metal together at their opposed surfaces by the use of heating current and pressure applied in line with the weld in a manner to unite them by what is ordinarily termed a spot weld.

The invention is particularly applicable to the welding of heavy steel or iron plates together by spot welds.

In one of the methods as heretofore conducted it has been proposed to interpose a welding piece between the back surface of the plate or plates and the current supplying and pressure applying electrode and of a size commensurate with the welded spot, said welding piece or button, as it is sometimes called, being also usually of iron or steel or of material similar to that of the pieces to be welded so that it becomes incorporated in the finished work as an essential part thereof.

It has also been proposed to unite plates of metal by the use of an electrode of copper or other good conducting material the end of which that engages the back surfaces of the work being pointed or of restricted area predetermined by the size of the welded spot that it is desired to produce.

In the latter method as ordinarily conducted the electrode becomes worn away after one or more operations thus changing the area of contact thereof with the work and so damaging the contacting end as to make it necessary to replace said electrode. Furthermore, the electrode itself being of comparatively soft metal although of good conducting quality, may be deformed at its contact end by the heavy welding pressure and so that the end will mushroom or become upset. This is particularly the case when the attempt is made to weld thick plates or heavy stock, since with thick plates it is necessary to use very heavy pressure and a larger current than is required for thinner work. Hence a practical limit is soon reached in the thickness of work that may be commercially and successfully spot welded by what is termed the electrode process.

The special object of my invention is to make it feasible to dispense with the use of a pointed electrode and to weld very heavy work without damage to the electrode and without the use of welding buttons or pieces which are of a character to become softened and incorporated with or welded into the work itself.

To these ends my invention consists in a novel method of spot welding consisting in first applying to the back of the work, as for instance a sheet to be spot welded by its surface to an opposite member, a button or piece of good conducting material such for instance as copper and of a size and in a location predetermined by the size and location of the spot weld which it is desired to produce and then applying to the button and work, assembled between the working dies, current and pressure by means of an electrode having a working face of larger area than said button to effect a welding of the inner surface of the plate or member to the surface of the opposite member.

In this operation it will be seen that the size and location of the spot weld is primarily determined by the size of the piece or button of good conducting material and the locating of it on the back surface of the plate prior to the actual welding operation and that the electrode itself may have a working face for engaging the button of any desired area or preferably of larger area than the button, instead of being pointed or reduced to a size approximating that of the weld and that it may be used indefinitely without renewal, the only expense being a supply of the small pieces of copper in quantity and of size required and of comparatively small value as compared with the electrode itself. The large expense of renewal of the usual pointed electrode is thus avoided.

As will be seen, in this operation it is not necessary to apply the electrode proper with exactness or special care centrally over the welded spot, the location of the spot being chosen by applying the button itself at the proper point and serving itself, in the actual welding operation, as the point of the electrode which may be detached from the work and discarded after the work is completed.

Preferably I use a heavy block or electrode of much larger mass or cross-sectional area than the button or piece itself, since said electrode in that case aids in keeping down the temperature of the welding button and prevents softening thereof by the heating current or effect, thereby preserving it throughout the process as a medium for the application or transference of the very heavy pressure required from the electrode itself, said button being, as already stated, of restricted size predetermined by the size of the spot weld to be produced and being therefore more liable to deformation by the applied pressure.

For the purpose of explaining my invention it will be assumed that the process is conducted in the operation of welding two heavy plates of iron and steel together in their opposed surfaces.

In the accompanying drawings I have shown in side elevation in Fig. 1 the class of work to which the invention may be applied and comprising two plates of iron or steel 1, 1 to be spot welded together on their opposed surfaces.

Fig. 2 is a section of the finished work. 2 indicates the welding piece or pieces composed of good conducting material such, for instance, as the material of which the electrodes 3 are composed, to wit: copper. Said welding piece is of a size or area predetermined by the size or area of the spot which it is desired to produce and thereby acts in effect as the contact end or point for the main electrode 3 by which it is engaged.

The members to be welded having been arranged in the proper relative position, the welding piece is applied to the back of one of them at the location of the spot of welding to be produced, after which said parts, with the button so located, are located in assembled position placed between the dies 3 3 and subjected to heating current and pressure by means thereof, the button then acting at this stage of the operation practically as the point of the main electrode to localize the weld.

With heavy work pressure is applied in sufficient amount to cause the button or piece to sink into the back surface of the plate or plates thereby applying effective welding pressure while at the same time the material of the piece being of high conductivity, effectively localizes the heating current, but said piece, although sunk in the surface, does not become incorporated therewith and may be removed after the work is finished.

In the operation the large mass of the electrode back of the piece serves to conduct the heat away therefrom and maintain it at sufficiently low temperature to permit it to transfer the pressure effectively. The result of the operation where the piece is but partially imbedded although the weld is completed is illustrated in the cross-section Fig. 2.

In this method it will be seen that the pressure and heating localizing member of the apparatus is the contacting button or piece which, inasmuch as it does not become incorporated as a part of the work, serves really as the contacting end of the electrode proper being made of good conducting material like said electrode and of size only such as would be employed for the ordinary pointed electrode used in electrode spot welding.

I am aware that it has been before proposed to interpose a separate plate of good conducting material like copper between the electrode and the work to avoid pitting of the electrode, as for instance in roller seam welding and in other cases where a spot weld electrode is used, but in all previous instances of which I am aware said interposed piece of copper does not act as the pressure localizing member of the apparatus. Where such interposed piece of copper has been employed in connection with an electrode it has served merely to conduct current while the localization of heat and pressure is determined by the size of the surface of the electrode back of such piece and making contact therewith.

What I claim as my invention is:—

1. The herein described improvement in spot welding two plates or sheets of metal in their opposed surfaces consisting in locating upon the back of the work a heat and pressure localizing piece of higher conductivity than the work and of a size predetermined by the size of the spot weld to be produced assembling the plates or sheets with the located button between welding dies and applying heating current and pressure sufficient to sink said piece in the surface of the work and effect a weld without incorporating the same in the finished work.

2. The herein described improvement in spot welding two plates of metal together consisting in locating upon the back surface of the work a heat and pressure localizing piece of metal of a size predetermined by the size of the weld to be produced and in the position over the welding spot, and of a conductivity greater than that of the work and then applying an electrode of larger mass and working surface area than the piece and effecting a weld in a meeting surface of the plates by current and pressure applied through said electrode and localizing piece, said pressure being made sufficient to sink the piece in the surface of the work and effect a weld between the pieces without welding or incorporating said piece with the work.

3. The herein described method of spot welding two plates or pieces of iron or steel together consisting in applying to the back of a plate a heating and pressure localizing piece of good conducting material like copper and of a size and in a location corresponding to the size and location of the spot weld to be produced and then applying to the plates and localizing piece assembled together, welding dies or blocks of any desired size and of heat conducting capacity adapted to prevent fusion of the applied copper piece and effecting the weld of the iron or steel by the application of heating current and pressure through said dies and without causing said piece to become incorporated with the work.

4. The herein described method of spot welding two plates or pieces of iron or steel together, consisting in applying to the back of the work and in position over the spot of welding, a heat and pressure localizing piece of comparatively good conducting material and of a size predetermined by the size of the spot weld to be produced assembling the work with the piece so applied in position between the electrodes and subjecting the work to pressure and heating current applied through said separate localizing piece and so as to effect the weld without causing said piece to become incorporated with the work.

Signed at New York in the county of New York and State of New York this 15th day of February A. D. 1922.

LAURENCE S. LACHMAN.

Witnesses:
F. B. TOWNSEND,
GEORGE E. BROWN.